United States Patent Office 3,023,243
Patented Feb. 27, 1962

3,023,243
LONG CHAIN ALKOXY DIAMINES
Harry A. Stansbury, Jr., South Charleston, and Howard R. Guest, Charleston, W. Va., assignors to Union Carbide Corporation, a corporation of New York
No Drawing. Filed Oct. 19, 1956, Ser. No. 616,936
3 Claims. (Cl. 260—584)

This invention pertains to a new series of long chain alkoxy-substituted diamines, in which the amino groups are in the terminal positions, and to a method for making them. In this series of compounds, the terminal amino groups are separated by an odd number of carbon atoms, which is at least seven, and the number of alkoxy substituents is related to the chain length of the diamines by the relationship, $$N = 1 + \frac{n-7}{2}$$

where N is the number of alkoxy substituents, and $n$ is the odd number of carbon atoms in the chain.

Long chain diamines in which the terminal amino groups are separated by an odd number of carbon atoms have heretofore been available only in low yields by an expensive synthesis. For example, 1,7-heptanediamine has been prepared by passing the lactone of gamma-hydroxypimelic acid and ammonia over a dehydrating catalyst at 325° C. to 550° C., and catalytically hydrogenating the so-formed heptenedinitrile. The present invention not only includes a commercially attractive method for making long chain primary diamines, but it also provides a novel series of alkoxy-substituted diamines. Such alkoxy-substituted diamines are of particular value in making polyamides, wherein the alkoxy substituents contribute lower melting points and increased compatibility with synthetic resins. The process of the present invention also permits the preparation of N,N′-derivatives of the alkoxy diamines.

The basic raw materials utilized in the new synthesis of long-chain alkoxy-substituted diamines are acrolein and vinyl alkyl ethers, both of which are available commercially at reasonable costs. In the first step, acrolein is condensed in a known manner with a vinyl alkyl ether to yield a 2-alkoxy-3,4-dihydro-2H-pyran. This pyran is reacted with an alkanol in such a manner as to open the pyran ring and form 1,1,5,5-tetra-alkoxypentanes or glutaraldehyde diacetals. These diacetals are then reacted with at least one mole of an alkyl vinyl ether to form diacetals of alkoxy-substituted alpha, omega dialdehydes having at least one alkoxy-substituent in the chain and at least seven carbon atoms in the chain. The chain length of these dialdehyde diacetals increases in increments of two carbon atoms, depending on the number of moles of vinyl alkyl ether reacted, and they contain an added alkoxy group for each increment of two carbon atoms in the chain. These alkoxy-substituted dialdehyde diacetals are then hydrolyzed to the corresponding dialdehydes, which are then aminated to form the long chain alkoxy-substituted diamines of this invention.

The various steps of the synthesis are illustrated below:

(I)
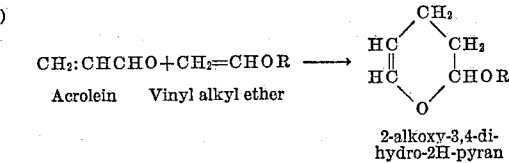
Acrolein  Vinyl alkyl ether
2-alkoxy-3,4-di-hydro-2H-pyran

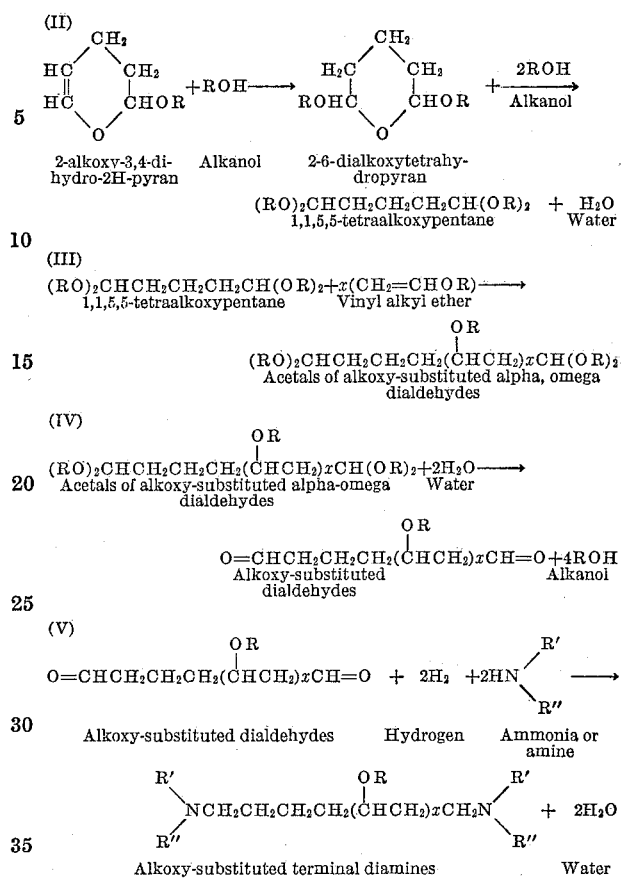

R′ and R″ are hydrogen or hydrocarbyl radicals.

It will be noted that overall synthesis involves the addition of vinyl alkyl ethers, stepwise, first to a three carbon atom compound, acrolein, and then the resulting five carbon atom compound, the glutaraldehyde acetals. Furthermore, the process is regenerative, in that the alcohol used in step II is recovered in the hydrolysis step IV. As all the steps may be carried out with good efficiencies, the overall process is an effective one for converting acrolein and vinyl alkyl ethers to long chain terminal diamines and their N,N′-substitution products.

The preferred class of alkoxy-substituted terminal diamines of this invention are represented by the formula:

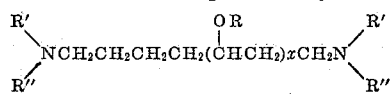

where $x$ has a value from 1 to 10, depending on the number of moles of vinyl alkyl ether reacted with the glutaraldehyde diacetal in step III of the synthesis. In the above formula, R is an alkyl radical having from 1 to 8 carbon atoms, and may be the same or different throughout the chain, depending on whether a mixture of vinyl alkyl ethers is used in step III of the synthesis, and on whether the alkyl radical of the 1,1,5,5-tetraalkoxypentane is the same as or different from the alkyl radical of the vinyl alkyl ether used in the reaction, and R′ and R″ are hydrogen or lower alkyl radicals, such as methyl, ethyl or butyl.

While it is possible to isolate definite compounds from the diamine mixtures of this invention, such as 3-ethoxy-1,7-heptanediamine, the more valuable compositions will comprise mixtures of such diamines where $x$ has a value from 1.5 to 5.5.

In such reactions of the vinyl alkyl ether with the 1,1,5,5-tetraalkoxypentane, it is desirable to use an acidic catalyst. Suitable catalyst include boron trifluoride and acid treated clays. The reaction temperatures may be from about −10° C. to about 100° C. with 30° C. to 60° C. being the preferred range. The corresponding reaction processes may vary from about 5 to 150 p.s.i.a. with pressures of 15 p.s.i.a. to 50 p.s.i.a. being preferred.

The hydrolysis of the alkoxy-substituted acetals to the alkoxy-substituted dialdehydes, shown in step IV of the synthesis, is best accomplished at a pH of 1 to 5, with a pH of 2 to 3 being preferred. The hydrolysis temperatures are in the range of 20° C. to 150° C. with temperatures of 80° C. to 100° C. being preferred. Depending on the temperature, the reaction time may vary from a few minutes to as long as 20 hours. The amount of water used for the hydrolysis may be varied from about 10% of the weight of the acetals to about 500%, with about 100% being preferred.

The reductive amination of the alkoxy-substituted dialdehydes to the alkoxydiamines proceeds best under pressure and at an elevated temperature. The hydrogenation temperature may be from 30° C. to 180° C. at pressures from 100 p.s.i.a. to 2000 p.s.i.a. A hydrogenation catalyst, such as Raney nickel or cobalt, is usually employed.

Among the amines useful in such reductive amination are methyl amine, ethyl amine, diethyl amine, butyl amine, dibutyl amine, hexyl amine, 2-ethylhexylamine, di(2-ethylhexyl) amine, ethanolamine, isopropanolamine, N-(2-aminoethyl) ethanolamine and aniline.

The alkoxy-substituted terminal diamines of this invention are extremely valuable intermediates because the alkoxy-substituted carbon chains between the terminal amino groups can be varied from a minimum of seven carbon atoms to as long as twenty-seven carbon atoms. Thus, a proper balance can be maintained in the final derivative between the properties contributed by the alkoxy-substituted carbon chain and the functional group employed to combine with the terminal amino groups. Thus, the diamines may form a series of polyamides with dibasic acids.

Depending on the chain length of the diamine, which may be 7, 9, 11 or higher, the ratio of amine chain length to acid chain length can readily be varied to control the softening point of the polyamides. The resulting polyamides are useful for fibers, films and molding compositions.

The diamines of this invention are useful hardeners for epoxide resins, serving as cross-linking agents because of the reactivity of the primary or secondary amino groups with the epoxy groups of the resins. The tertiary diamine of this invention, for instance, those diamines of the above formula where both R' and R'' are alkyl, serve as catalysts for the polymerization of the epoxide resins through reaction of the epoxy groups. Epoxy resins mixed with the diamines of this invention have a longer pot life than epoxy resins mixed with other aliphatic polyamines, since the long chains between the amine groups reduces the reactivity of the diamines as hardeners.

Among the polyepoxides suitable for reaction with the diamines of this invention, are the polyglycidyl ethers formed by reacting epichlorhydrin with polyphenols, such as 2,2-bis(hydroxyphenyl)propane (Bisphenol A), 1,1,3-tris(hydroxyphenyl)propane and 1,1,2,2-tetra(hydroxyphenyl)ethane. Other diepoxides which may be reacted with the diamines to form polymers include butadiene diepoxide and vinylcyclohexane diepoxide.

In such hardening and polymerization reactions with diepoxide, the alkoxy-substituted diamines provide versatility as cross-linking agents because the chain length of the diamine can be varied.

Certain of the diamine derivatives, such as the N,N'-diethyl derivative, are useful repellents for house flies.

The various steps of the synthesis of the diamines from acrolein and vinyl alkyl ethers are illustrated in the examples to follow, the first step of the synthesis, the formation of the 2-alkoxy-3,4-dihydro-2H-pyrans, being shown in U.S. Patent No. 2,514,168.

PREPARATION OF 1,1,5,5-TETRAALKOXYOXY-PENTANE—STEP II

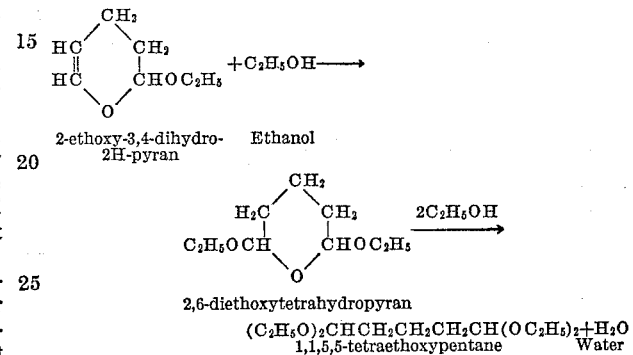

2-ethoxy-3,4-dihydro-2H-pyran  Ethanol 2,6-diethoxytetrahydropyran $(C_2H_5O)_2CHCH_2CH_2CH_2CH(OC_2H_5)_2 + H_2O$
1,1,5,5-tetraethoxypentane  Water

Example 1

A mixture of 2760 grams of anhydrous ethanol (60 moles) and 3.68 grams of 96% sulfuric acid (0.075 equivalent) was stirred at 40° C.–55° C. while 768 grams of 2-ethoxy-3,4-dihydro-2H-pyran (6 moles) were fed over a period of 30 minutes. The solution was refluxed for 1 hour to complete the reaction. After 8.2 grams of anhydrous sodium acetate (0.1 equivalent) were added, the mixture was distilled under reduced pressure to obtain 2,6-diethoxytetrahydropyran in 43% yield and 1,1,5,5-tetraethoxypentane in 53% yield based on 2-ethoxy-3,4-dihydro-2H-pyran.

Example 2

A mixture of 3.68 grams of 96% sulfuric acid (0.075 equivalent), 1918 grams of anhydrous ethanol (43 moles) and 748 grams of 2,6-diethoxy-tetrahydropyran (4.3 moles) was refluxed for 2 hours. After 8.2 grams of anhydrous sodium acetate were added to neutralize the catalyst, the mixture was fractionated under reduced pressure to obtain 1,1,5,5-tetraethoxypentane in 52% yield and 98% efficiency based on 2,6-diethoxytetrahydropyran.

CONDENSATION OF 1,1,5,5-TETRAALKOXYPENTANE WITH VINYL ALKYL ETHER—STEP III $(C_2H_5O)_2CHCH_2CH_2CH_2CH(OC_2H_5)_2 + CH_2=CHOC_2H_5 \longrightarrow$
1,1,5,5,-tetraethoxypentane  Ethyl vinyl ether $\underset{\text{1,1,3,7,7-pentaethoxyheptane}}{(C_2H_5O)_2CHCH_2CH_2CH_2\overset{\overset{\displaystyle OC_2H_5}{|}}{C}HCH_2CH(OC_2H_5)_2} \xrightarrow{CH_2=CHOC_2H_5}$ $\underset{\text{1,1,3,5,9,9-hexaethoxynonane}}{(C_2H_5O)_2CHCH_2CH_2CH_2\overset{\overset{\displaystyle OC_2H_5}{|}}{C}HCH_2\overset{\overset{\displaystyle OC_2H_5}{|}}{C}HCH_2CH(OC_2H_5)_2} +$ $\underset{\text{1,1,3,7,9,9-hexaethoxynonane}}{(C_2H_5O)_2CHCH_2\overset{\overset{\displaystyle OC_2H_5}{|}}{C}HCH_2CH_2CH_2\overset{\overset{\displaystyle OC_2H_5}{|}}{C}HCH_2CH(OC_2H_5)_2}$

Example 3

A mixture of 124 grams of 1,1,5,5-tetraethoxypentane (0.5 mole) and 52 grams of "Superfiltrol" (an acid-treated clay sold by the Filtrol Corporation) was stirred at 25° C.–30° C. while a solution of 144 grams of ethyl vinyl ether (2 moles) in 248 grams of 1,1,5,5-tetraethoxypentane (1 mole) was fed over a period of 40 minutes. After a reaction period of half an hour at 25° C., the mixture was filtered. The filtrate was mixed with 5 grams of potassium carbonate (to neutralize traces of acid) and distilled to obtain the following product fractions:

| Fraction | Boiling range | Equivalent weight as acetal | Sp. g. 20/20° | n 30/D |
|---|---|---|---|---|
| 1 | 121°–132° C./1 mm. | 152.2 | 0.930 | 1.4242 |
| 2 | 132°–154° C./1 mm. | 177.0 | 0.938 | 1.4273 |
| 3 | 154°–210° C./1 mm. | 191.0 | 0.958 | 1.4384 |

Fraction 1 was 1,1,3,7,7-pentaethoxyheptane, for which the theoretical equivalent weight as acetal is 160. Fraction 2 was a mid-cut, while fraction 3 was a mixture of 1,1,3,5,9,9-hexaethoxynonane and the isomeric 1,1,3,- 7,9,9-hexaethoxynonane, for which the theoretical equivalent weight is 196. The yield of 1,1,3,7,7-pentaethoxyheptane was 13%, while the yield of hexaethoxynonane was 25% based on the ethyl vinyl ether.

*Example 4*

A mixture of 1.6 grams of 47% boron trifluoride in diethyl ether (0.033 equivalent) and 303 grams of 1,1,5,5-tetraethoxypentane (1.22 mole) was stirred at 35°–40° C. while a solution of 432 grams of ethyl vinyl ether (6 moles) in 744 grams of 1,1,5,5-tetraethoxypentane (3 moles) was fed over a period of one hour and forty minutes. After a reaction period of 45 minutes at 35° C., 5.3 grams of powdered anhydrous sodium carbonate (0.1 equivalent) were added and the mixture was stirred for 2 hours at 30° C. The mixture was filtered and the filtrate was flash-distilled (in the presence of 5 grams of sodium carbonate) to a kettle temperature of 248° C. at a reduced pressure of 4 mm. The residue (437 grams) had an equivalent weight of 344 by acetal analysis.

The flash-distilled product fraction (514 grams) was fractionated to isolate the following fractions:

| Fraction | Boiling range | Equivalent weight as acetal | Sp.g. 20/20° | n 30/D |
|---|---|---|---|---|
| 1 | 143°–153° C./3 mm | 166.5 | 0.928 | 1.4258 |
| 2 | 153°–163° C./3 mm | 186.0 | 0.933 | 1.4287 |
| 3 | 163°–175° C./3 mm | 201.0 | 0.937 | 1.4308 |
| 4 | 175°–212° C./3 mm | 221.0 | 0.943 | 1.4350 |

Fraction 1 was 1,1,3,7,7-pentaethoxyheptane, fraction 2 was a mid-cut, fraction 3 was a mixture of 1,1,3,5,9,9-hexaethoxynonane and the isomeric 1,1,3,7,9,9-hexaethoxynonane and fraction 4 was mostly the latter isomeric mixture. The yield of 1,1,3,7,7-pentaethoxyheptane was 10% and the yield of hexaethoxynonane was 15% based on 1,1,5,5-tetraethoxypentane.

PREPARATION OF ALKOXY SUBSTITUTED DIALDEHYDES—STEP IV $(C_2H_5O)_2OCHCH_2CH_2CH_2CH(OC_2H_5)_2 + xCH_2=CHOC_2H_5 \longrightarrow$
1,1,5,5-tetraethoxypentane    Ethyl vinyl ether

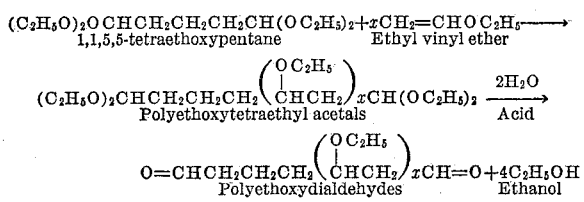

Polyethoxytetraethyl acetals  $\xrightarrow{\text{2H}_2\text{O}}{\text{Acid}}$ $O=CHCH_2CH_2CH_2\left(\underset{|}{\overset{OC_2H_5}{C}}HCH_2\right)_xCH=O + 4C_2H_5OH$
Polyethoxydialdehydes    Ethanol

*Example 5*

A mixture of 992 grams of 1,1,5,5-tetraethoxypentane (4 moles) and 40 grams of "Superfiltrol" (dried at 200° C. for 17 hours) was stirred at 45°–50° C. while a solution of 864 grams of ethyl vinyl ether (12 moles) in 1984 grams of 1,1,5,5-tetraethoxypentane (8 moles) was fed over a period of 2.5 hours. After a reaction period of 2 hours at 50° C., the mixture was cooled and filtered. The filtrate was stripped (in the presense of 35 grams of anhydrous potassium carbonate) to a kettle temperature of 175° C./1 mm. to recover 1,1,5,5-tetraethoxypentane. The filtered residue product had these properties: n 30/D 1.4310, sp. gr. 20/20° 0.938, 197.5 equivalent weight by acetal analysis. This analysis indicated that the average chain length was about 9 carbon atoms. The yield and efficiency were 40% and 95%, respectively based on tetraethoxypentane. The yield and efficiency based on ethyl vinyl ether were 82% and 90%, respectively.

The above polyethoxytetraethyl acetal (1724 grams, 8.72 equivalents) was mixed with an equal weight of water and 33 ml. of 0.5 N sulfuric acid were added to reduce the pH to 3. The mixture was distilled with reflux for 5.5 hours until no more ethanol was being generated. Analysis of the aqueous ethanol distillate (967 grams) showed that it was 83% ethanol, which corresponded to a quantitative yield of ethanol based on the acetal charged. The residue was separated into 803 grams of oil layer which contained 4.37 equivalents of aldehyde and 1686 grams of water layer which contained 3.18 equivalents of aldehyde by analysis. The yield of dialdehydes based on the tetraethyl acetals was 86.6%.

*Example 6*

A mixture of 744 grams of 1,1,5,5-tetraethoxypentane (3 moles) and 4.4 grams of 43% boron trifluoride in diethyl ether was stirred at 50° C. while a solution of 1296 grams of ethyl vinyl ether (18 moles) in 1488 grams of 1,1,5,5-tetraethoxypentane (6 moles) was fed over a period of 2.1 hours. The catalyst was neutralized by the addition of gaseous anhydrous ammonia. The mixture was filtered and stripped to a kettle temperature of 175° C. at a reduced pressure of 3 mm. to obtain 2537 grams of polyethoxytetraethyl acetals as a residue product having n 30/D 1.4340, sp. g. 20/20° 0.944, 214 equivalent weight by acetal analysis. The yield and efficiency based on vinyl ether were 82% and 90%, respectively. The yield and efficiency based on 1,1,5,5-tetraethoxypentane were 66% and 90%, respectively.

The polyethoxytetraethyl acetal (2530 grams, 214 equivalent weight) 11.82 equivalents, $x=2.5$ in the general formula) was distilled with 1250 ml. of water containing 25 ml. of 0.5 N sulfuric acid to reduce the pH to 2. After 8 hours, 1313 grams of aqueous ethanol had been distilled and no more ethanol was being formed. The residue was separated into 1653 grams of oil layer which contained 10.8 equivalents of aldehyde and 801 grams of aqueous layer which contained 0.662 equivalents of aldehyde by analysis. The yield of dialdehydes based on the acetals was 97%.

*Example 7*

A mixture of 1948 grams of polyethoxytetraethyl acetals (192 equivalent weight, $x=2.03$, 10.15 equivalents) was distilled with 1948 ml. of water containing 30 ml. of 0.5 N sulfuric acid to reduce the pH to 3. After 6 hours, 1199 grams of distillate containing 20.6 moles of ethanol had been collected and no more ethanol was being liberated. The residue was separated into 914 grams of oil layer which contained 6.12 equivalents of aldehyde and 1758 grams of aqueous layer containing 3.30 equivalents of aldehyde by analysis. The yield of dialdehydes was 93% based on the acetals.

PREPARATION OF POLYETHOXYDIAMINES MINAL DIAMINES—STEP V

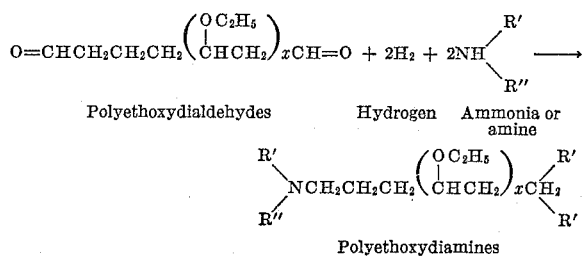

Polyethoxydialdehydes    Hydrogen   Ammonia or amine

Polyethoxydiamines

PREPARATION OF POLYETHOXYDIAMINES

Example 8

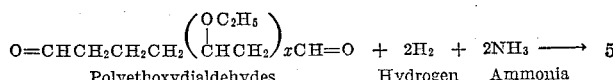
Polyethoxydialdehydes    Hydrogen  Ammonia

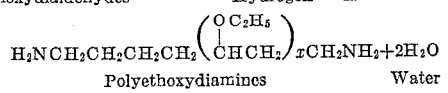
Polyethoxydiamines                              Water

An aqueous mixture of polyethoxydialdehydes (2.46 equivalents in 818 grams of mixture) was mixed with 50 grams of Raney nickel and 170 grams of anhydrous ammonia (10 moles) in a rocking-type of autoclave. After a reaction period of 10 minutes at 40°–45° C., hydrogen was added to increase the pressure to 800 p.s.i.g. and the temperature was raised to maximum of 148° C. over a period of 3.5 hours. The filtered mixture was stripped to a kettle temperature of 78° C./7 mm. to obtain a viscous residue product having these properties: $n$ 30/D 1.4853, sp. g. 28/20° 0.994, 164 equivalent weight by analysis for amine, 366 molecular weight by the Menzies-Wright method, partially soluble in water. The yield of amine was 70% based on the dialdehyde.

The stripped residue product was distilled to obtain the fractions described below.

| Fraction | Boiling range, ° C. | Pressure, mm. | Eq. wt. (1) | $x$ (2) | Mol. wt. (3) | Miscible with water? | $n$ 30/D | Sp. G. 20°/20° | Percent of still charge |
|---|---|---|---|---|---|---|---|---|---|
| 1 | 97–120 | 3 | 103 | 1.45 | | Yes | 1.4776 | 0.938 | 11 |
| 2 | 120–160 | 4 | 124 | 2.03 | 188 | Yes | 1.4782 | 0.964 | 14 |
| 3 | 160–193 | 4 | 136 | 2.36 | | Partially | 1.4789 | 0.979 | 11 |
| 4 | (4) 193–233 | 0.2 | 179 | 3.56 | 470 | No | 1.4804 | 0.983 | 26 |
| Residue | | | | | | No | | | 38 |

(1) Determined by analysis for amine.
(2) Calculated from the observed equivalent weight.
(3) Determined by the Menzies-Wright method.
(4) Rotor temperature on the molecular still in which fraction 4 was distilled.

Example 9

An aqueous mixture of polyethoxydialdehydes was prepared in 95% yield by hydrolysis of the corresponding acetals having an average equivalent weight of 216.3, which corresponds to $x=2.63$ in the general formula. The dialdehyde mixture (309 gms. containing 1.38 equivalents of aldehyde) was treated with 5 ml. of 2% NaOH to increase the pH to 5.5 and then charged to a rocking autoclave along with 600 ml. of ethanol solvent and 70 grams of Raney nickel. After 340 grams of anhydrous ammonia (20 moles) were added, the mixture was shaken at 34°–38° C. for 10 minutes. Then hydrogen was added to a maximum pressure of 1100 p.s.i.g. and the mixture was heated to 150° C. over a period of an hour. The mixture was filtered and stripped to a kettle temperature of 100° C./5 mm. to obtain 160 grams of a viscous residue product having $n$ 30/D 1.4811 and 137 equivalent weight as determined by amine analysis. The yield was 85% based on the aldehyde charged.

Example 10

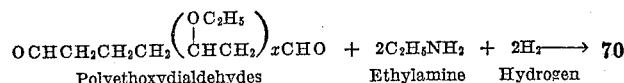
Polyethoxydialdehydes    Ethylamine  Hydrogen

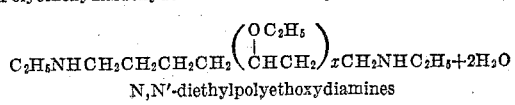
N,N'-diethylpolyethoxydiamines

Twenty moles of 64.7% aqueous ethylamine were stirred at 20° C. while an aqueous mixture of polyethoxydialdehydes (1.1 equivalents, average of $x$ in above formula was 2.5) were fed over a period of 40 minutes. The resulting solution was hydrogenated at a maximum temperature of 150° C. and 1000 p.s.i. The filtered mixture was stripped to a kettle temperature of 80° C./10 mm. to obtain a residue product having these properties: $n$ 30/D 1.4597, sp. g. 20°/20° 0.922, 162.7 equivalent weight by amine analysis (theory 169), 316.5 molecular weight by the Menzies-Wright method (theory 338), 9.1% N (theory 8.3%), 67.1% C (theory 67.5%), 11.2% H (theory 12.4%), partially soluble in water. The yield was 95%.

Example 11

The condensation product of the polyethoxydialdehydes and N-(2-aminoethyl)ethanolamine was hydrogenated to form a mixture of the corresponding polyethoxytetraminediols having the general formula illustrated below.

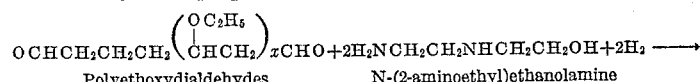
Polyethoxydialdehydes    N-(2-aminoethyl)ethanolamine

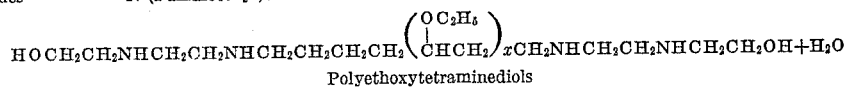
Polyethoxytetraminediols

Twenty moles of N-(2 aminoethyl)ethanolamine were stirred at 20° C. while an aqueous mixture of polyethoxydialdehydes (1.1 equivalents of aldehyde contained, average of $x$ in above formula was 2.5) was fed over a period of 40 minutes. The resulting solution was hydrogenated in the presence of 3 percent Raney nickel to a temperature of 150° C. and 1000 p.s.i.g. The filtered mixture was stripped to a kettle temperature of 256° C./5 mm. to obtain the mixture of polyethoxytetraminediols as a viscous residue product having these properties: $n$ 30/D 1.4980, 106.8 equivalent weight by amine analysis (theory 114), 238.5 equivalent weight by hydroxyl analysis (theory 228), 426 molecular weight by the Menzies-Wright method (theory 456), miscible with water. The yield was 80 percent. The product was useful as an epoxy resin hardener, having both reactive amino and hydroxyl groups.

Example 12

The product of Example 10 was evaluated as an epoxy resin hardener. On mixing equivalent amounts of the diamine and the diglycidyl ether of Bisphenol A (2,2'-diphenylolpropane), a pot life of 67 minutes was obtained with a low degree of heat released. The total mass of the sample was 50 grams at an ambient temperature of 27 to 28° C.

Test specimens of castings which were allowed to gel at room temperatures and then baked for two hours at 120° C. had the following physical properties:

Heat distortion _____ 73° C.
Rockwell hardness-M _____ 92.
Izod impact _____ 0.38 ft. lb./in. width.
Flexural strength _____ 16,700 p.s.i.
Flexural modulus of elasticity ____ 44 × 10$^5$ p.s.i.

What is claimed is:

1. A mixture of alkoxy-substituted diamines of the formula—

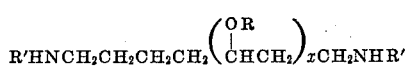

where R is an alkyl radical having from 1 to 8 carbon atoms, R' is a radical from the group consisting of hydrogen and an alkyl radical having from 1 to 4 carbon atoms and $x$ has an average value from 1.5 to 5.5.

2. A mixture of alkoxy-substituted alpha, omega primary diamines of the formula—

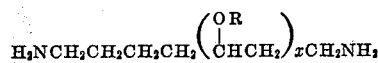

where R is an alkyl radical having from 1 to 8 carbon atoms and $x$ has an average value from 1.5 to 5.5.

3. Polyethoxytetraminediols of the formula—

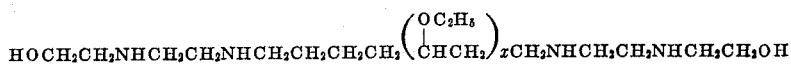

where $x$ has an average value from 1.5 to 5.5.

References Cited in the file of this patent

UNITED STATES PATENTS

| | | |
|---|---|---|
| 2,487,525 | Copenhaver | Nov. 8, 1949 |
| 2,502,443 | Copenhaver | Apr. 4, 1950 |
| 2,506,486 | Bender et al. | May 2, 1950 |
| 2,514,168 | Smith et al. | July 4, 1950 |
| 2,532,277 | Castle | Dec. 5, 1950 |
| 2,533,723 | Dombrow | Dec. 12, 1950 |
| 2,556,312 | Young | June 12, 1951 |
| 2,768,976 | Weidlich | Oct. 30, 1956 |

FOREIGN PATENTS

| | | |
|---|---|---|
| 698,736 | Great Britain | Oct. 21, 1953 |

OTHER REFERENCES

Stevenson: Industrial and Engineering Chemistry, vol. 41, No. 9 (1949), page 1848.

Karrer: Organic Chemistry (1950), page 162.

Migrdichian: Org. Synthesis, vol. I (1951), page 202.

Coffman et al.: J. Am. Chem. Soc., vol 76 (1954), page 6394.